United States Patent

[11] 3,612,016

| [72] | Inventor | William J. Jelen<br>24634 Water St., Olmsted Falls, Ohio 44138 |
|---|---|---|
| [21] | Appl. No. | 54,107 |
| [22] | Filed | July 13, 1970 |
| [45] | Patented | Oct. 12, 1971 |

[54] VALVE SPRING RETAINER
7 Claims, 5 Drawing Figs.

[52] U.S. Cl. ................................................. 123/90.67,
251/337
[51] Int. Cl. ............................................................. F01l 3/10
[50] Field of Search .......................................... 251/337;
123/90.65, 90.66, 90.67, 188 SP

[56] References Cited
UNITED STATES PATENTS
1,327,539   1/1920   Finney......................... 251/337

| 1,453,471 | 5/1923 | LeTarte................... | 251/337 |
| 1,448,221 | 3/1923 | Johnson................... | 251/337 |
| 1,554,227 | 9/1925 | Nickol...................... | 123/90.67 X |
| 1,775,069 | 9/1930 | Finney...................... | 251/337 |
| 2,844,134 | 7/1958 | Sietman.................... | 123/90.67 X |

Primary Examiner—Al Lawrence Smith
Attorney—J. H. Slough

ABSTRACT: A formed valve spring retainer means is provided which includes an annular ring extending inwardly into a plurality of formed resilient locking means particularly adapted to securely engage an annular groove located proximate to the distal end of a valve stem. The outward portion of the annular ring extends into a downwardly disposed dependent flange portion whereby the under surfaces of the retainer means is particularly adapted to maintain a valve spring in compression and concentric about the valve stem during the operative cycle of an internal combustion engine.

PATENTED OCT 12 1971

3,612,016

INVENTOR
William J. Jelen
BY
J. H. SLOUGH
ATTORNEY

VALVE SPRING RETAINER

This invention pertains to improved valve assemblies for internal combustion engines and more particularly to retainer means for maintaining the valve spring in secure engagement within the valve assembly.

Valves for internal combustion engines are repeatedly opened and closed several times per second during the operative cycles of an internal combustion engine. An eccentric cam is operative against the force of a compressed valve spring encircling the valve stem thereby causing the valve to reciprocate within the engine block as the valves are rapidly opened and closed.

Valve assemblies often causes servicing problems during assembling and disassembling due to the multiplicity of parts necessary to secure the valve spring. Minimum space provided makes accessibility to the valves difficult during servicing, wherein smaller parts, such as holding keys, pins and clips for securing the valve spring to the valve stem are difficult to handle and may be accidentally dropped into the crank case of the engine. Therefore, it is desirable to provide a retainer for maintaining the valve spring in compression which is simple in design, and yet, sturdy enough to withstand the adverse operating conditions encountered within an internal combustion engine.

SUMMARY

In accordance with the present invention, a valve spring retainer means is provided comprising an annular ring having an outer depending annular flange portion and a plurality of inwardly disposed, formed locking means particularly adapted to be easily and quickly assembled with and securely locked to the valve stem. The spring retainer means engages a compressed valve spring disposed concentric about each valve stem and maintains the spring secure during rapid reciprocation of the valves throughout the various operative cycles of an internal combustion engine.

Accordingly, it is a principal object of this invention to provide an improved one-piece spring retainer means adapted to easily slip onto the valve stem and securely lock thereto.

A further object of this invention is to provide a sturdy valve spring retainer means which is simple in construction and economical to manufacture.

A still further object is to provide a strong and durable spring retainer means secured to the valve stem for maintaining the valve spring concentric about the valve stem.

Another object is to provide a spring retainer means which securely locks to the valve stem and yet can be easily removable from the valve stem with a simple mechanic's tool.

Yet another object of this invention is to provide a valve spring retaining means secured to the valve stem without the need for a multiplicity of small accessory parts.

A further object of this invention is to provide an improved valve assembly proved valve assembly having a minimum of parts that can be easily and quickly assembled and disassembled.

These and other objects and advantages of this invention will become more apparent from the following detailed description thereof and the accompanying drawings, in which said drawings: FIG. 1 is a transverse section through a portion of an engine block showing an overhead valve assembly including the spring retainer means of this invention;

Figure 1:
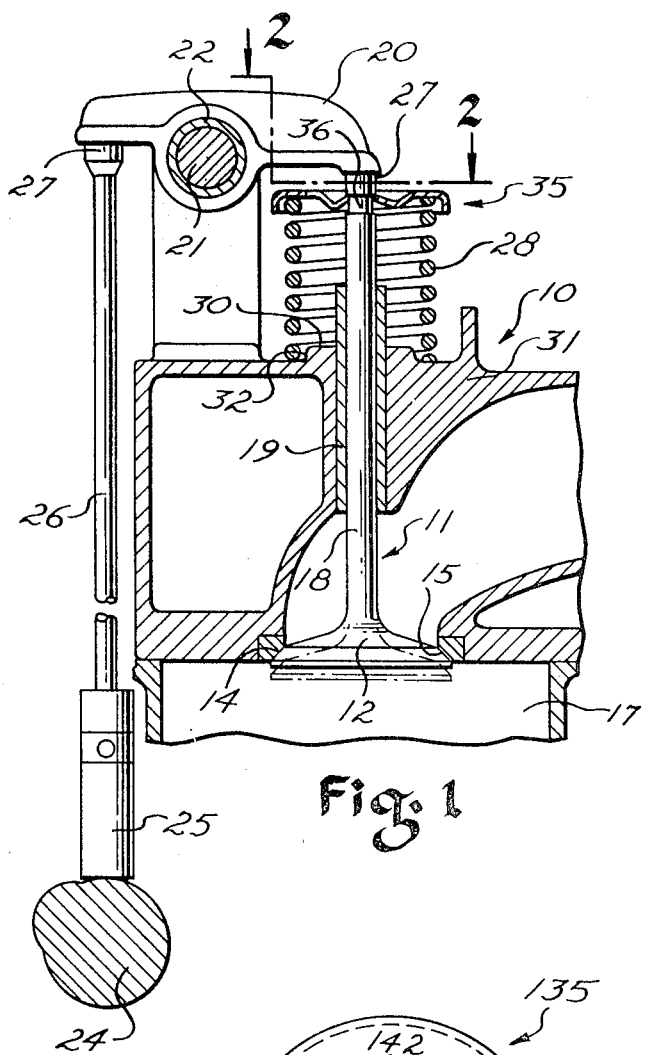
Figure 2:
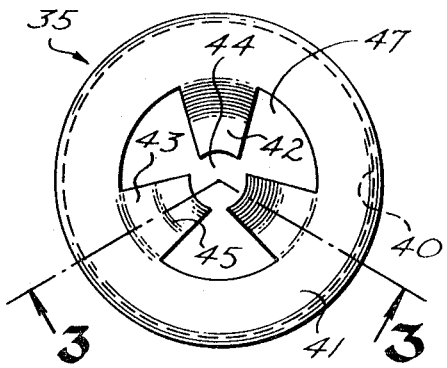
FIG. 2 is an enlarged top plan view of the spring retainer means as viewed from the line 2—2 of FIG. 1.

Referring now to the drawings wherein like parts are identified by like reference characters, shown is a portion of an internal combustion engine block 10 housing a valve assembly illustrative of this invention.

The valve assembly is generally indicated at 11 and comprises a valve head 12 having a tapered peripheral edge or valve face 14 adapted to seat on a valve seat 15 provided in the wall portion 16 of the engine block 10. The complementary surfaces, valve face 14 and valve seat 15, provide a tight seal within the cylinder chamber 17 when the valve assembly 11 is in a closed position. The valve head 12 is secured to a valve stem 18 extending upwards within a valve guide 19 secured secured within a bore provided in the housing block 10. The upper end portion 27 of the valve stem 18 is in operative engagement with the lower surface of the rocker arm 20 pivotally mounted to the block 10 by means of a pin 21 and bushing 22. A cam assembly comprising a rotating eccentric cam 24 engaging a valve lifter 25 secured to a pushrod 26 engages the underside surface of the rocker arm 20 and operatively provides reciprocative motion to the valve by movement of the rocker arm 20 about its pin and bushing assembly 21, 22 in a manner well-known in the art.

The reciprocating motion of the valve is operative against the upward force of a compressible spring 28 surrounding the valve stem 18 and maintained concentric thereabout. Strong compression springs are required to withstand rapid reciprocating motion of the valve upon opening and closing the valve in rapid succession wherein the compressed spring 28 holds the peripheral valve face 14 in tight engagement with the valve seat 15 during the compression cycle of the engine piston. The valve spring must be maintained concentric about the valve stem for smooth performance of the valve assembly and to avoid undesirable stress and fatigue of the spring. Hence, the interior wall portion 31 of the engine is provided with a raised circular surface 30 having a peripheral shoulder 32 which engages and abuts the interior dimension of the lower portion of the spring thereby centering the spring 28 during reciprocating compression thereof. The upper portion of the spring 28 engages a spring retainer means 35 secured to the valve stem 18. The upper end portion of said valve stem is provided with a reduced annular groove 36, and the spring retainer means is adapted to lock to the valve stem 18 within the annular groove 36 and is further adapted to maintain the compressed spring concentric about the valve stem 18 in a manner to be hereinafter described in detail.

Figure 3:
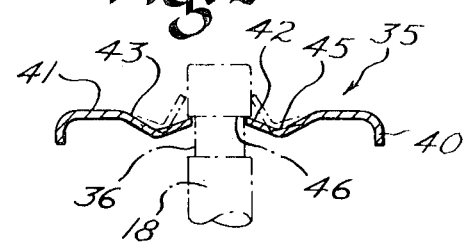
FIG. 3 is a partial section view taken along the line 3—3 of FIG. 2 and showing progressive placement of the spring retainer means onto the valve stem.
Figure 4:
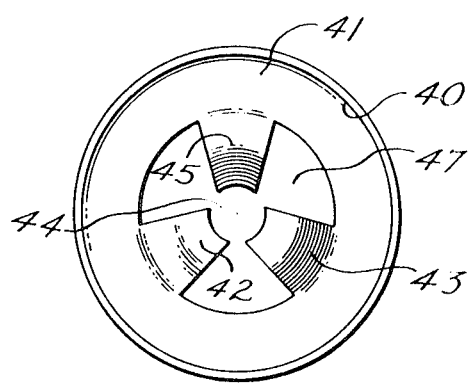
FIG. 4 is a plan bottom view of the spring retainer means.

The spring retainer means 35 comprises an annular ring 41 extending into an outwardly disposed, downwardly directed, integral flange portion 40 whereby the lower surface of the annular ring 41 and the adjacent surface of flange 40 engage the spring 28 to maintain said spring concentric about the valve stem 18. The spring retainer 35 further includes integral locking means disposed inwardly from the annular ring portion 41 for gripping the centrally located valve stem 18. The locking means comprises a plurality of formed projections extending inwardly of the annular ring portion 41, each projection including a downwardly angled portion 43, an intermediate annular indentation 45, and an upwardly extending gripping portion 42 having terminating end portions defining a centrally located aperture 44 adapted to receive the valve stem 18. A plurality of spaced openings 47, circumferentially spaced between the annular ring portion 41 and the central aperture 44, separate the spaced gripping means. The formed gripping portions 42 are slightly resilient and adapted to separate and recover in a manner characteristic of spring steel, as shown in phantom lines in FIG. 3, thereby permitting expedient passage of the valve stem 18 through the central aperture 44 of the spring retainer means 35. Upon engaging the annular groove or reduced portion 36 of the valve stem 18, the expanded gripping portions 42 recover to securely grip the valve stem 18 circumferentially and abut a peripheral shoulder 46 defining the upper edge of the groove 36 as shown in FIG. 3, thus providing secure attachment of the spring retainer means 35 to the valve stem 18. Accordingly, it is readily seen that the upwardly extending formed slightly resilient gripping portions 42 of the locking means provide expedient assembly of the valve assembly, and yet, provide secure engagement of the spring retainer to the valve stem.

Figure 5:
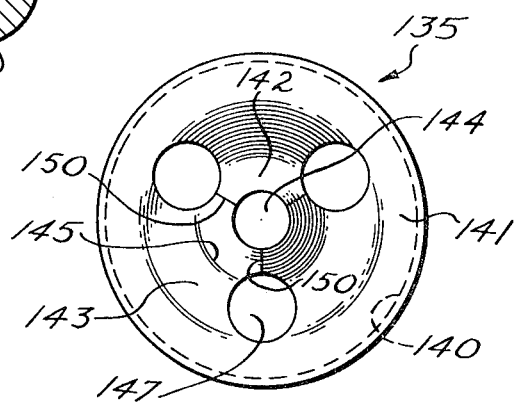
FIG. 5 is a plan view of another embodiment of the spring retainer means of the invention.

Referring now to FIG. 5, illustrated therein is a spring retainer means 135 illustrative of a second embodiment of this invention. The spring retainer 135 includes an annular ring 141 having an outwardly disposed and downwardly directed flange portion 140 and an inwardly extending locking means. The locking means comprises a plurality of inwardly formed web portions each having downwardly angled portions 143, an annular indentation 145, and upwardly extending gripping or engaging portions 142. The web portions terminate inwardly defining hereinbefore central aperture 144. The web portions are radially adjacent or abut each other proximate to the central aperture 144 being separated only by narrow slits 150 therebetween, as shown in FIG. 5. A plurality of circumferentially spaced openings 147 separate the individual web portions proximate to the spaced extending portion 143 and adjacent to the annular ring 141. In like manner, the web portions thus formed provide a slight resiliency to the gripping means 142 whereby the respective gripping portions 142 separate slightly and thereafter recover thus accommodating the assembly of the spring retainer means with the valve stem 18, as hereinbefore described and illustrated in FIG. 3.

In both embodiments, the spring retainer means is assembled with the valve and valve spring by forcing the spring retainer over the distal end of the valve stem and engaging the valve spring with the underside surface of the retainer means. The spaced formed locking means resiliently adjust thereby permitting the valve stem to be forced through the central aperture provided in the spring retainer means. The locking means engage the annular groove provided in the valve stem whereby the plurality of upwardly extending gripping means 42, 142 of the retainer means recover and securely lock within the annular groove in abutment with shoulders formed adjacent to the annular groove. Hence, the retainer ring securely locked to the valve stem sustains the valve spring in compression and maintains the valve spring concentric about the valve stem during the various cycles of an internal combustion engine. To remove the retainer means, the procedure is simply reversed by separating the locking portions or gripping means with a suitable mechanic's tool so as to disengage the locking means from the annular groove. The gripping means engages the upper portion of the valve stem whereupon the retainer means is easily slid off the distal end of the valve stem.

The present invention provides a formed spring retainer means for easy and quick assembly with a valve stem and maintains secure attachment thereto overcoming structural weaknesses and servicing problems in valve assemblies including the elimination of a multiplicity of parts.

Although specific embodiments have been hereinbefore described it is understood that the subject invention is not limited thereto and all obvious variations and modifications thereof are contemplated and are included within the spirit and scope of the invention as defined in the appended claims.

I claim:

1. A valve spring retainer means adapted to lock within an annular groove provided in a valve stem, comprising: a formed ring having an annular ring portion extending into an outwardly disposed and downwardly dependent flange portion for engaging a valve spring; a plurality of formed locking means extending inwardly from said annular ring portion; said locking means having terminating inwardly extending end portions defining a central aperture adapted to engage a valve stem; said locking means including a formed annular indentation spaced between said terminal end portions and said annular ring portion; said terminal end portions angled upwardly of said formed annular indentation; said locking means separated by a plurality of spaced openings circumferentially located between said annular ring portion and said central aperture whereby each locking means is adapted to separate slightly and engage a valve stem upon mounting therewith.

2. The valve spring retainer of claim 1 wherein the inwardly extending formed locking means includes downwardly angled extending portions located between said annular ring portion and said annular indentation whereby the annular indentation is located in a horizontal plane disposed below the annular ring portion.

3. The valve spring retainer of claim 1 wherein the circumferential width of each said inwardly disposed formed locking means is greater at the annular indentation than the circumferential width of each terminal end portion.

4. The valve spring retainer means of claim 1 wherein said terminating end portions have circumferentially rounded engaging surfaces particularly adapted to engage a round valve stem.

5. The valve spring retainer means of claim 1 wherein the circumferentially spaced openings between said locking means are predominately located between said annular indentation and said annular ring portion.

6. The valve spring retainer means of claim 1 wherein said locking means comprise three spaced members.

7. The valve spring retainer means of claim 1 wherein said locking means comprises three spaced web members having the terminal end portions thereof radially adjacent to each other.